US012638109B2

(12) United States Patent
Wu

(10) Patent No.: US 12,638,109 B2
(45) Date of Patent: May 26, 2026

(54) VALVE CONNECTOR

(71) Applicant: Co-Luck Enterprise Co., Ltd., Taichung City (TW)

(72) Inventor: Scott Wu, Taichung City (TW)

(73) Assignee: Co-Luck Enterprise Co., Ltd., Taichung City (TW)

( * ) Notice: Subject to any disclaimer, the term of this patent is extended or adjusted under 35 U.S.C. 154(b) by 19 days.

(21) Appl. No.: 18/957,151

(22) Filed: Nov. 22, 2024

(65) Prior Publication Data

US 2025/0305591 A1 Oct. 2, 2025

(30) Foreign Application Priority Data

Apr. 1, 2024 (TW) ................................. 113112390
Jun. 24, 2024 (TW) ................................. 113123386

(51) Int. Cl.
*F16K 24/06* (2006.01)
*F16K 24/04* (2006.01)
*F16L 19/02* (2006.01)

(52) U.S. Cl.
CPC .......... *F16L 19/0218* (2013.01); *F16K 24/04* (2013.01); *F16K 24/06* (2013.01)

(58) Field of Classification Search
CPC ....... F16L 19/0218; F16K 24/04; F16K 24/06
USPC ......... 251/149, 149.6, 149.8; 137/515, 515.5
See application file for complete search history.

(56) References Cited

U.S. PATENT DOCUMENTS 2,322,877 A * 6/1943 Parker ..................... F16L 37/23
251/149.6
2,327,611 A * 8/1943 Schelwer ............ F16L 37/0982
251/149.6

3,961,645 A * 6/1976 Kagan ..................... F16L 37/40
251/149.6
5,060,988 A * 10/1991 Williamson .......... F16L 19/025
285/354
5,337,782 A * 8/1994 Wilcox ................... F16L 37/35
251/149.6
5,983,920 A * 11/1999 Gapinski .................. B60S 5/04
251/149.6

(Continued)

FOREIGN PATENT DOCUMENTS

TW       I1748884 B   * 10/2020   .............. F04B 33/00
TW       M602589      * 12/2021   .............. F16L 19/03

OTHER PUBLICATIONS

TW I748884 Translation (Year: 2021).*
TW M602589 Translation (Year: 2020).*

*Primary Examiner* — Umashankar Venkatesan

(74) *Attorney, Agent, or Firm* — MUNCY, GEISSLER, OLDS & LOWE, P.C.

(57) ABSTRACT

A valve connector includes a body and a control component. The body has a through hole divided into a first receiving section and a second receiving section. The control component has a body portion with a guide hole connecting to the through hole. The body portion has an abutting end and a control end exposed at the second end for attachment to an inflating device. The control component can move relative to the body, with the abutting end selectively entering the first receiving section to abut against the core rod of the Schrader valve, and with a sealing ring selectively abutting the second receiving section, enabling easy detachment of the valve from the valve connector.

19 Claims, 12 Drawing Sheets

(56) References Cited

U.S. PATENT DOCUMENTS

| | | | |
|---|---|---|---|
| 6,767,002 B2* | 7/2004 | Kerger | F16K 1/302 |
| | | | 251/149.6 |
| 7,951,474 B2* | 5/2011 | Schembri | H01M 50/325 |
| | | | 429/61 |
| 11,300,224 B2* | 4/2022 | Wu | F16K 15/20 |
| 12,066,134 B2* | 8/2024 | Wu | F16F 9/43 |
| 12,449,079 B2* | 10/2025 | Wu | F16L 37/44 |
| 2003/0197379 A1* | 10/2003 | Glover | F16L 19/12 |
| | | | 285/342 |
| 2005/0242315 A1* | 11/2005 | Lund | F16L 37/42 |
| | | | 251/149.6 |
| 2015/0114500 A1* | 4/2015 | Von Keitz | F16J 15/00 |
| | | | 251/149.6 |
| 2017/0307123 A1* | 10/2017 | Liu | F16L 37/23 |
| 2025/0305602 A1* | 10/2025 | Wu | F16K 24/04 |

* cited by examiner

VALVE CONNECTOR

BACKGROUND OF THE INVENTION

The present invention primarily discloses a type of valve connector, specifically one that can prevent air leakage when connecting to or disconnecting from a valve.

Conventional valve connectors for inflators commonly experience brief air leakage when connecting to and disconnecting from a valve. Furthermore, once the user inflates an object to the desired pressure, they must disconnect the valve connector from the valve on the object. When the valve connector detaches, the gasket inside the connector can no longer seal around the valve body. At this point, however, the ejector pin of the valve connector still presses against the core rod of the valve, causing the air that was pumped to the desired pressure to escape from the core chamber of the valve body. This results in an actual pressure lower than the intended pressure, making it difficult to achieve precise inflation.

Therefore, preventing air leakage when connecting or disconnecting the valve connector has become an urgent issue that industry professionals seek to resolve.

In light of these deficiencies in conventional structures, the inventor has designed a valve connector that overcomes all of the aforementioned drawbacks.

SUMMARY OF THE INVENTION

The main objective of the present invention is to provide a valve connector, which comprises a body and a control component. The body has a first end for connecting to a Schrader valve, a second end opposite the first end, and a through hole extending between the first end and the second end. An inner peripheral surface of the through hole forms a shoulder dividing the through hole into a first receiving section and a second receiving section. The through hole is provided with a sealing ring on an inner peripheral surface of the second receiving section. The control component is movable relative to the body in an axial direction between a first position and a second position. The control component is provided with a body portion and a guide hole inside the body portion and communicating with the through hole. One end of the body portion forms an abutting end and the other end forms a control end exposed out of the second end for connecting to an inflating device. The guide hole allows airflow between the abutting end and the control end to facilitate communication between the through hole and the inflating device. The body portion is provided with a release portion positioned between the abutting end and the control end. The release portion has a proximal end near the abutting end, and a distal end farther from the abutting end. The proximal end has a first outer diameter, and the distal end has a second outer diameter greater than the first outer diameter. When the control component is in the first position, the sealing ring is positioned between the release portion and the control end and abuts against an outer peripheral surface of the body portion, with the abutting end inserting through the shoulder and entering the first receiving section to abut against a core rod of the Schrader valve. When the control component is in the second position, the sealing ring is positioned between the release portion and the abutting end and detaches from the outer peripheral surface of the body portion, with the abutting end withdrawing from the first receiving section.

In an embodiment, the through hole is provided with a first threaded section disposed on an inner peripheral surface of the first receiving section. The outer peripheral surface of the body portion is provided with a second threaded section engaged with the first threaded section to cause an axial displacement between the control component and the body when the control end is rotated.

In an embodiment, the through hole is provided with an inner thread disposed on the inner peripheral surface of the first receiving section for engaging with an outer thread of the Schrader valve. An annular groove is provided on one side adjacent to the shoulder and contains a sealing washer for engaging with the Schrader valve.

In an embodiment, the through hole is provided with an annular channel disposed on the inner peripheral surface of the second receiving section. The sealing ring is positioned within the annular channel to prevent air leakage from second end of the body during inflation.

In an embodiment, the body portion is provided with a connection hole disposed at the control end and communicating with the guide hole. The connection hole is connectable to a connecting component for attaching a hose of the inflating device. The body portion is provided with a receiving groove and a sealing portion within the connection hole. An outer peripheral surface of the connecting component is provided with a flange disposed between the receiving groove and the sealing portion. A fastener is arranged within the receiving groove to abut against the flange. A sealing ring is arranged on the outer peripheral surface of the connecting component to abut against the sealing portion.

In an embodiment, an outer peripheral surface of the body is provided with a patterned first anti-slip section. An outer peripheral surface of the control end of the body portion of the control component is provided with a patterned second anti-slip section.

Another object of the present invention is to provide a valve connector, which comprises a body and a control component. The body has a first end for connecting to a Schrader valve, a second end opposite the first end, and a through hole extending between the first end and the second end. An inner peripheral surface of the through hole forms a shoulder dividing the through hole into a first receiving section and a second receiving section. The through hole is provided with a release portion on an inner peripheral surface of the second receiving section. The release portion has a proximal end near the shoulder, and a distal end farther from the shoulder. The proximal end has a first inner diameter, and the distal end has a second inner diameter greater than the first inner diameter. The control component is movable relative to the body in an axial direction between a first position and a second position. The control component is provided with a body portion and a guide hole inside the body portion and communicating with the through hole. One end of the body portion forms an abutting end and the other end forms a control end exposed out of the second end for connecting to an inflating device. The guide hole allows airflow between the abutting end and the control end to facilitate communication between the through hole and the inflating device. The body portion is provided with a sealing ring positioned between the abutting end and the control end. When the control component is in the first position, the sealing ring is positioned between the release portion and the shoulder and abuts against the inner peripheral surface of the second receiving section, with the abutting end inserting through the shoulder and entering the first receiving section to abut against a core rod of the Schrader valve. When the control component is in the second position, the sealing ring is positioned between the release portion and the second end and detaches from the inner peripheral surface of the second receiving section, with the abutting end withdrawn from the first receiving section.

In an embodiment, the through hole is further divided into a third receiving section connected with the second end of the release portion. The second receiving section is defined with a first internal diameter. The third receiving section is defined with a second internal diameter greater than the first internal diameter.

In an embodiment, the through hole is provided with a first threaded section disposed on an inner peripheral surface of the first receiving section. An outer peripheral surface of the body portion is provided with a second threaded section engaged with the first threaded section to cause an axial displacement between the control component and the body when the control end is rotated.

In an embodiment, the through hole is provided with an inner thread disposed on the inner peripheral surface of the first receiving section for engaging with an outer thread of the Schrader valve. An annular groove is provided on one side adjacent to the shoulder and contains a sealing washer for engaging with the Schrader valve. The body portion is provided with an annular channel positioned between the abutting end and the control end. The sealing ring is positioned within the annular channel.

In an embodiment, a first length is defined from a midpoint of the annular channel to the abutting end. A second length is defined from the second end of the release portion to one end of the annular groove adjacent to the inner thread. The second length is greater than the first length.

In an embodiment, the body portion is provided with a connection hole disposed at the control end and communicating with the guide hole. The connection hole is connectable to a connecting component for attaching a hose of the inflating device. The body portion is provided with a receiving groove and a sealing portion within the connection hole. An outer peripheral surface of the connecting component is provided with a flange disposed between the receiving groove and the sealing portion. A fastener is arranged within the receiving groove to abut against the flange. A sealing ring is arranged on the outer peripheral surface of the connecting component to abut against the sealing portion.

In an embodiment, an outer peripheral surface of the body is provided with a patterned first anti-slip section. An outer peripheral surface of the control end of the body portion of the control component is provided with a patterned second anti-slip section.

The next objective of the present invention is to provide a valve connector, which comprises a body, a connecting assembly, a control component, and a lever. The body has an air channel and a penetrating hole communicating with the air channel. The connecting assembly is rotatably mounted to the penetrating hole and configured to connect with a Schrader valve. The connecting assembly is provided with a through hole communicating with the air channel. An inner peripheral surface of the through hole forms a release portion dividing the through hole into a first receiving section and a second receiving section. The release portion has a proximal end connected to the first receiving section, and a distal end connected to the second receiving section. The proximal end has a first internal diameter, and the distal end has a second internal diameter greater than the first inner diameter. The control component is movable relative to the connecting assembly in an axial direction between a first position and a second position. The control component is provided with a body portion and a guide recess outside the body portion and communicating with the through hole. One end of the body portion forms an abutting end and the other end forms a control end exposed out of the through hole. The guide recess allows airflow from the abutting end to facilitate communication between the through hole and the air channel. The body portion is provided with a sealing ring positioned at the control end. The lever is pivotally mounted to the connecting assembly to selectively push against the control end and actuate the control component to switch between the first position and the second position. When the control component is in the first position, the sealing ring is positioned in the first receiving section and abuts against an inner peripheral surface of the first receiving section, with the abutting end abutting against a core rod of the Schrader valve. When the control component is in the second position, the sealing ring is positioned between the release portion and the second receiving section and detaches from the inner peripheral surface of the first receiving section, with the abutting end spaced from the core rod of the Schrader valve.

In an embodiment, the valve connector further comprises a biasing member configured to bias the control component towards the second position. The lever has a pivoting portion and an actuation portion. The pivoting portion has a first abutting surface and a second abutting surface selectively abutting against the control end of the control component. When the control component is in the first position, the first abutting surface abuts against the control end to actuate the abutting end to push against the valve core of the air valve, allowing the through hole to communicate with the interior of the air valve, and the biasing member is compressed. When the control component is in the second position, the second abutting surface abuts against the control end, and the abutting end is spaced from the valve core of In an embodiment, the connecting assembly includes a first connecting member rotatably inserted into the through hole, and a second connecting member threadedly connected with the first connecting member. The lever is eccentrically pivotally mounted on the first connecting member. The biasing member is positioned within the first connecting member. The second connecting member protrudes from the penetrating hole and configured to connect with the Schrader valve.

In an embodiment, the first connecting member is provided with a pivoting notch pivotally connected with the pivoting portion of the lever.

In an embodiment, the second connecting member is provided with an inner thread therein. The inner thread is configured to detachably engage with an outer threaded portion of the Schrader valve. An annular groove is provided on one side adjacent to the inner thread and contains a sealing washer for engaging with the Schrader valve.

In an embodiment, the control end of the control component is provided with an annular channel. The sealing ring is positioned within the annular channel. A first length is defined from a midpoint of the annular channel to the abutting end. A second length is defined from the proximal end of the release portion to one end of the annular groove adjacent to the inner thread. The second length is greater than the first length.

The present invention will become clearer in light of the following detailed description of illustrative embodiments of this invention described in connection with the drawings.

DETAILED DESCRIPTION OF THE INVENTION

Figure 1:
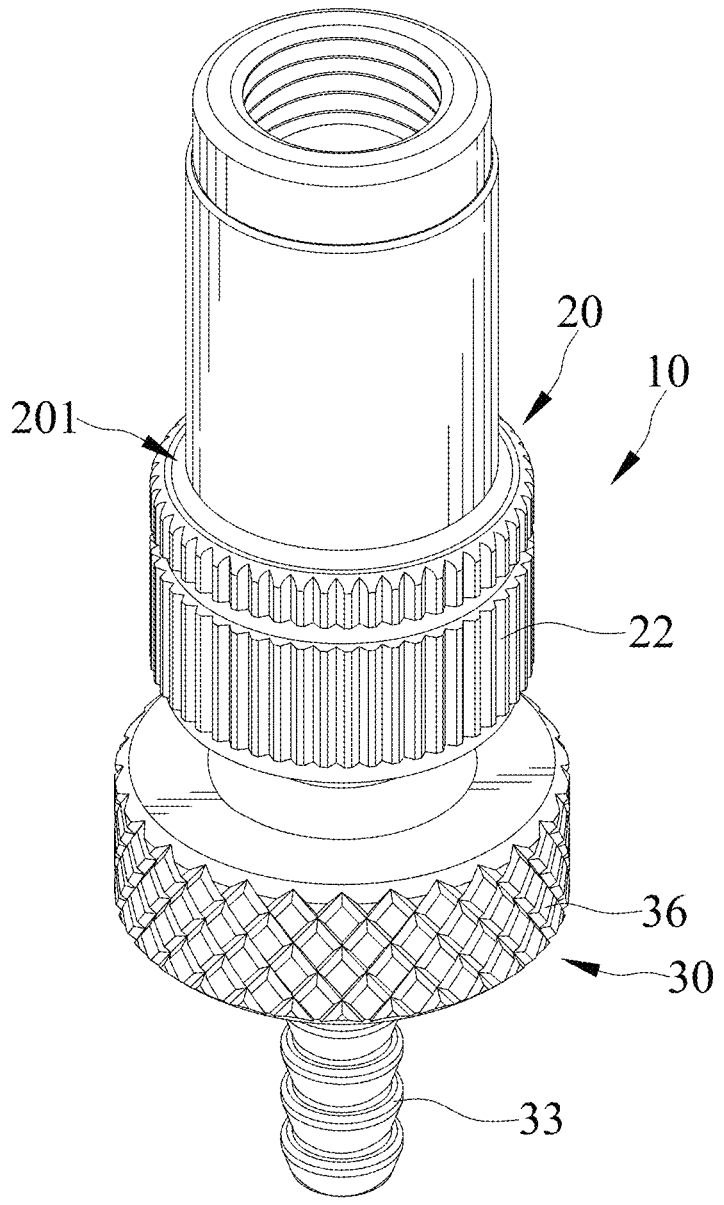
FIG. 1 is a perspective view of a valve connector of a first embodiment according to the present invention.
Figure 2:
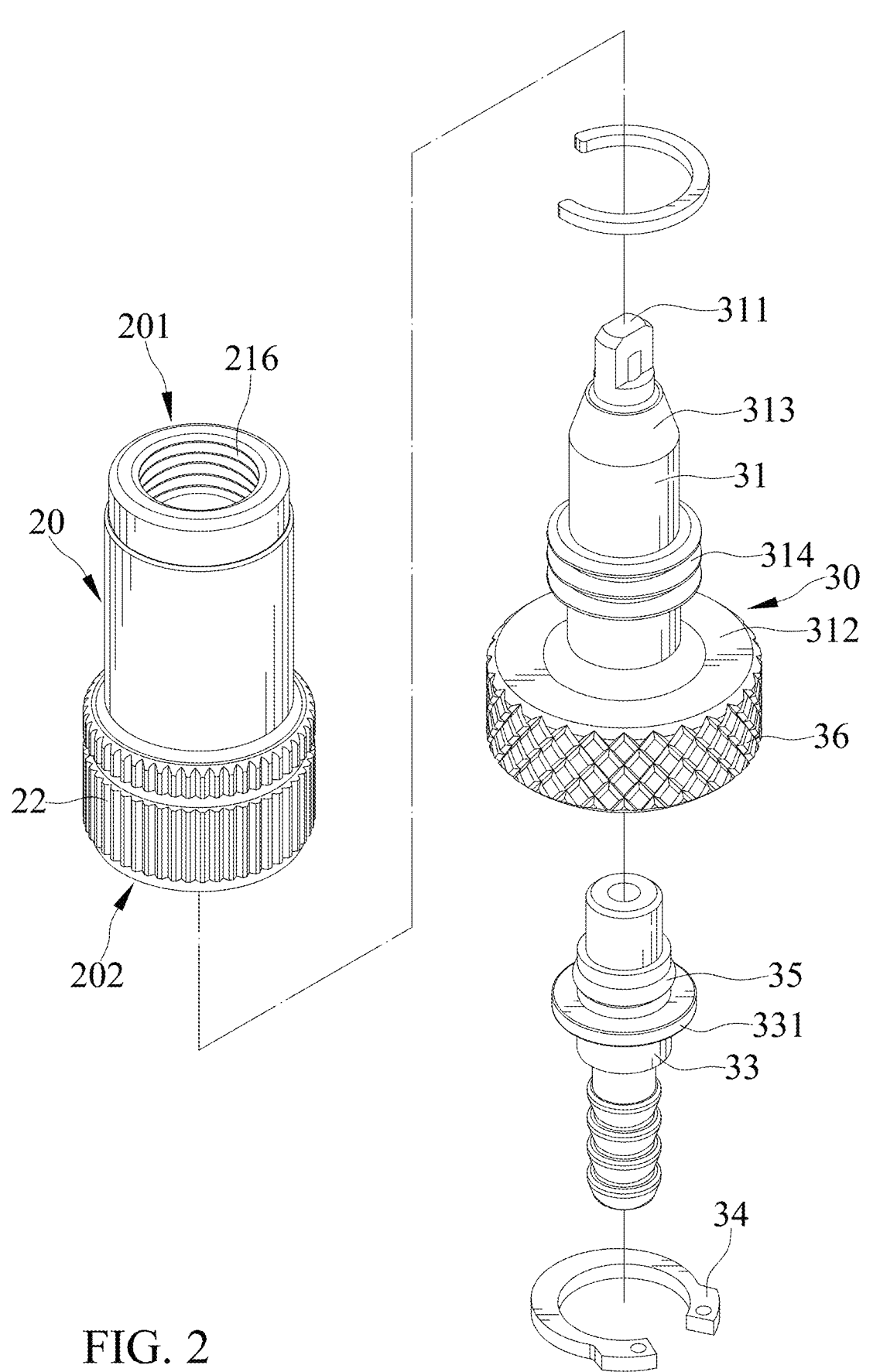
FIG. 2 is an exploded perspective view of the valve connector of FIG. 1.

FIGS. 1-5 show a valve connector 10 of a first embodiment according to the present invention. The valve connector 10 comprises a body 20 and a control component 30 moveable relative to the body 20.

The body 20 has a first end 201 for connecting to a Schrader valve AV, a second end 202 opposite the first end 201, and a through hole 21 extending between the first end 201 and the second end 202. An inner peripheral surface of the through hole 21 forms a shoulder 211 dividing the through hole 21 into a first receiving section 212 and a second receiving section 213. The through hole 21 is provided with a sealing ring 214 on an inner peripheral surface of the second receiving section 213.

Figure 3:
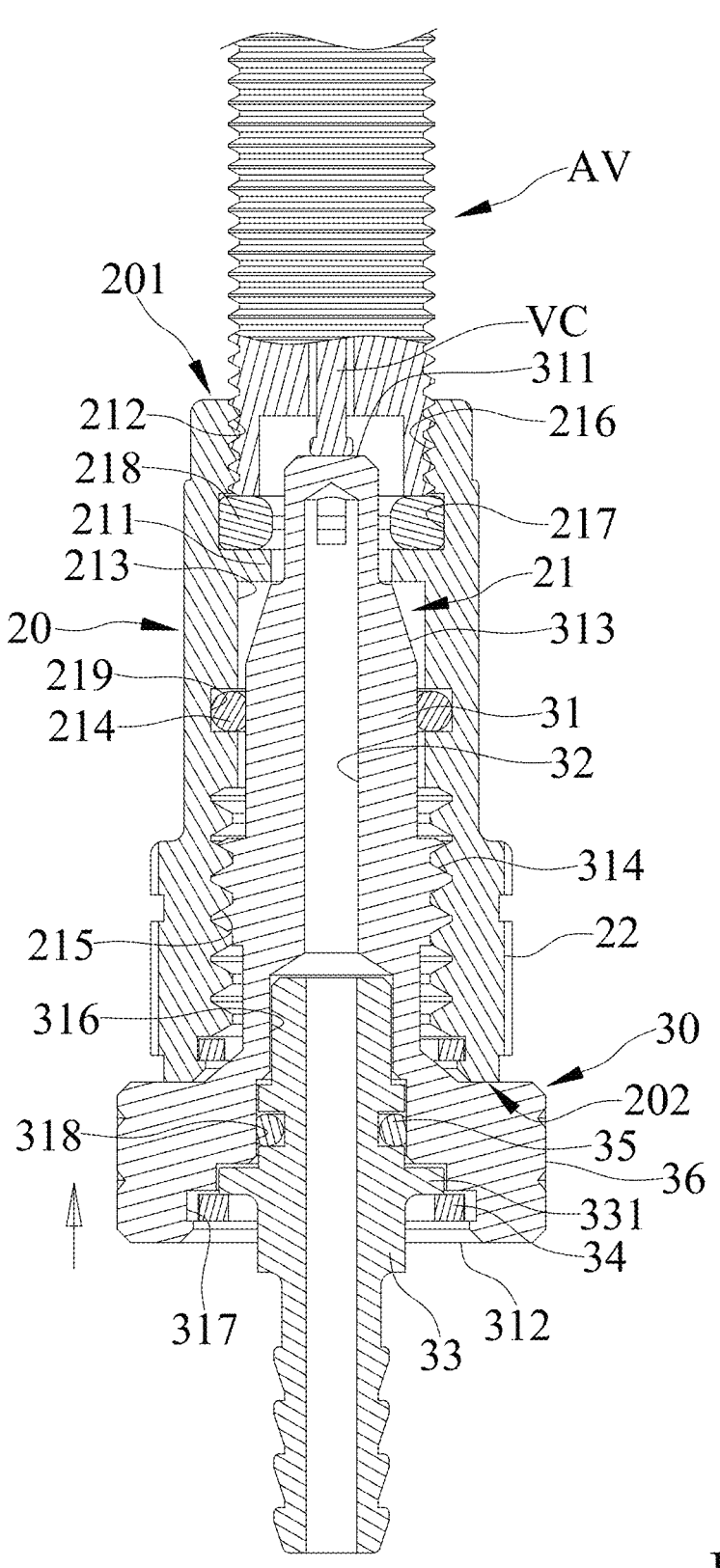
FIG. 3 is a cross-sectional view of the valve connector of FIG. 1 and shows a control component in a first position.
Figure 4:
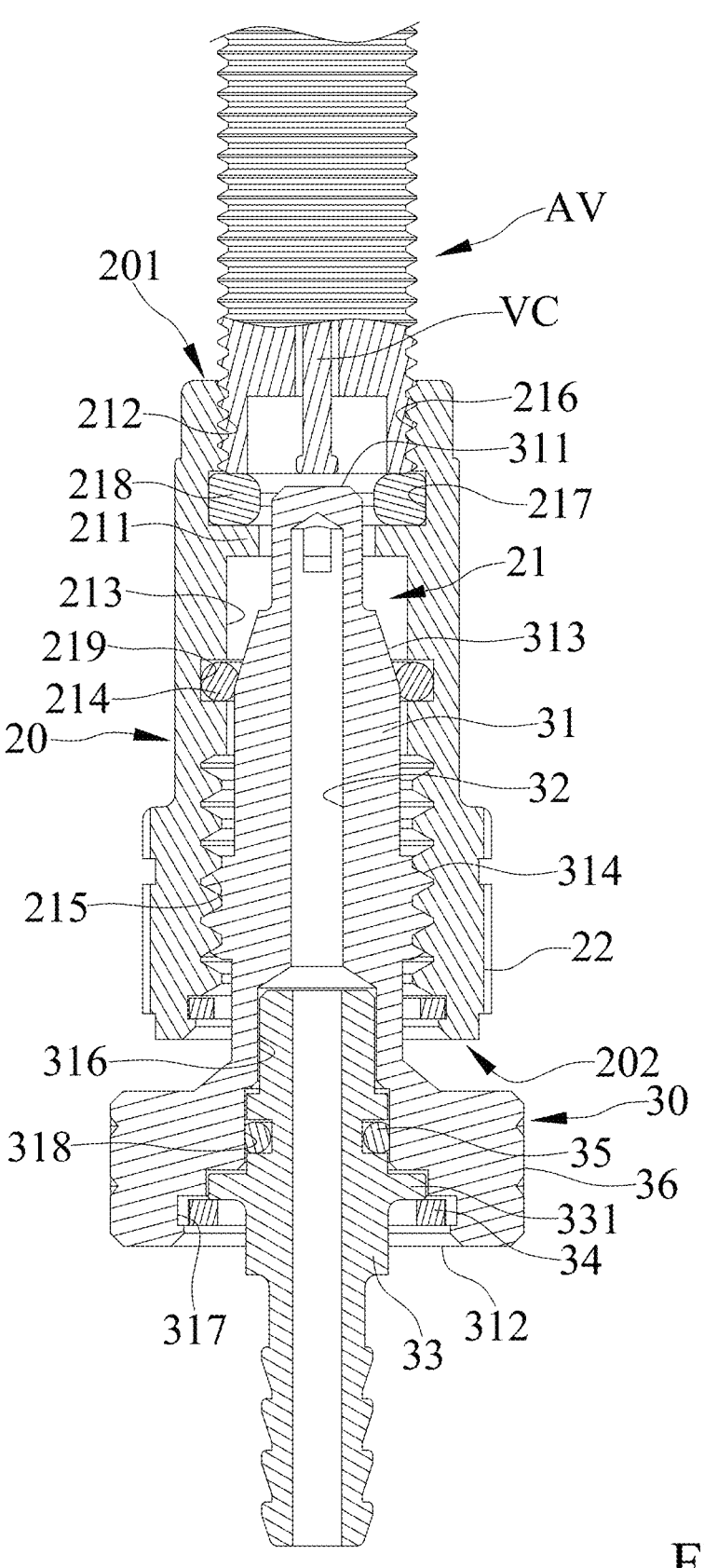
FIG. 4 is a cross-sectional view of the valve connector of FIG. 1 and shows the control component positioned between the first position and a second position.
Figure 5:
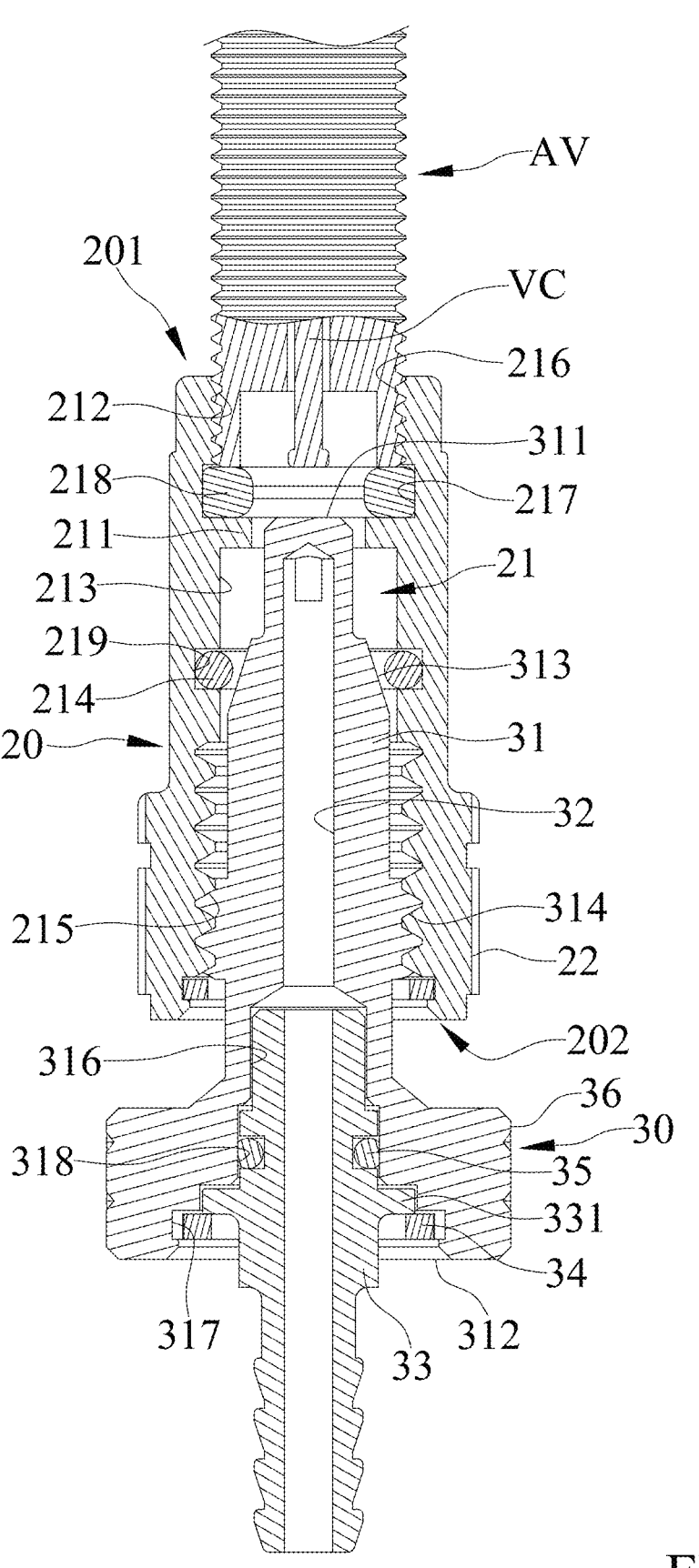
FIG. 5 is another cross-sectional view of the valve connector of FIG. 1 and shows the control component in the second position.

As shown in FIGS. 3 to 5, the control component 30 is movable relative to the body 20 in an axial direction between a first position and a second position. The control component 30 is provided with a body portion 31 and a guide hole 32 inside the body portion 31 and communicating with the through hole 21. One end of the body portion 31 forms an abutting end 311 and the other end forms a control end 312 exposed out of the second end 202 for connecting to an inflating device (not shown). The guide hole 32 allows airflow between the abutting end 311 and the control end 312 to facilitate communication between the through hole 21 and the inflating device. The body portion 31 is provided with a release portion 313 positioned between the abutting end 311 and the control end 312. The release portion 313 has a proximal end near the abutting end 311, and a distal end farther from the abutting end 311. The proximal end has a first outer diameter, and the distal end has a second outer diameter greater than the first outer diameter.

When the control component 30 is in the first position, the sealing ring 214 is positioned between the release portion 313 and the control end 312 and abuts against an outer peripheral surface of the body portion 31, and the abutting end 311 inserts through the shoulder 211 and enters the first receiving section 212 to abut against a core rod VC of the Schrader valve AV. When the control component 30 is in the second position, the sealing ring 214 is positioned between the release portion 313 and the abutting end 311 and detaches from the outer peripheral surface of the body portion 31, and the abutting end 311 withdraws from the first receiving section 212.

To allow the control component 30 to be rotatably inserted through the second end 202 and to establish an axial displacement relationship with the body 20, the through hole 21 is provided with a first threaded section 215 on an inner peripheral surface of the first receiving section 212. The outer peripheral surface of the body portion 31 is provided with a second threaded section 314 engaged with the first threaded section 215 to cause an axial displacement between the control component 30 and the body 20 when the control end 312 is rotated.

To enable the first end 201 of the body 20 to be suitable for connection with the Schrader valve AV, the through hole 21 is provided with an inner thread 216 disposed on the inner peripheral surface of the first receiving section 212 for engaging with an outer thread of the Schrader valve AV. An annular groove 217 is provided on one side adjacent to the shoulder 211 and contains a sealing washer 218 for engaging with the Schrader valve AV. Thus, when the outer thread of the Schrader valve AV engages with the inner thread 216, the Schrader valve AV can abut against the sealing washer 218 to prevent air leakage.

To prevent air from leaking out of the second end 202 of the body 20 during inflation, the through hole 21 is provided with an annular channel 219 disposed on the inner peripheral surface of the second receiving section 213, and the sealing ring 214 is positioned within the annular channel 219.

Furthermore, to enable the inflating device to connect with the control end 312, the body portion 31 is provided with a connection hole 316 disposed at the control end 312 and communicating with the guide hole 32. The connection hole 316 is connectable to a connecting component 33 for attaching a hose of the inflating device. The body portion 31 is provided with a receiving groove 317 and a sealing portion 318 within the connection hole 316. An outer peripheral surface of the connecting component 33 is provided with a flange 331 disposed between the receiving groove 317 and the sealing portion 318. A fastener 34 is arranged within the receiving groove 317 to abut against the flange 331. A sealing ring 35 is arranged on the outer peripheral surface of the connecting component 33 to abut against the sealing portion 318.

Additionally, to allow the user to conveniently hold the body 20 with one hand while rotating the control end 312 with the other hand, an outer peripheral surface of the body 20 is provided with a patterned first anti-slip section 22. An outer peripheral surface of the control end 312 of the body portion 31 of the control component 30 is provided with a patterned second anti-slip section 36.

In summary, by rotating the control end 312, the control component 30 and the body 20 create an axial displacement, allowing the abutting end 311 to push against the core rod VC of the Schrader valve AV to initiate inflation. Once inflation is complete, reverse rotation of the control end 312 causes the abutting end 311 to disengage from the core rod VC. High pressure air can be maintained within the through hole 21 before the sealing ring 214 detaches from the outer peripheral surface of the control component 30, preventing air leakage and precisely controlling the air pressure. When the control component 30 is moved to the second position, the high pressure air within the through hole 21 can quickly release, allowing the Schrader valve AV to be easily removed from the inner thread 216.

Figure 6:
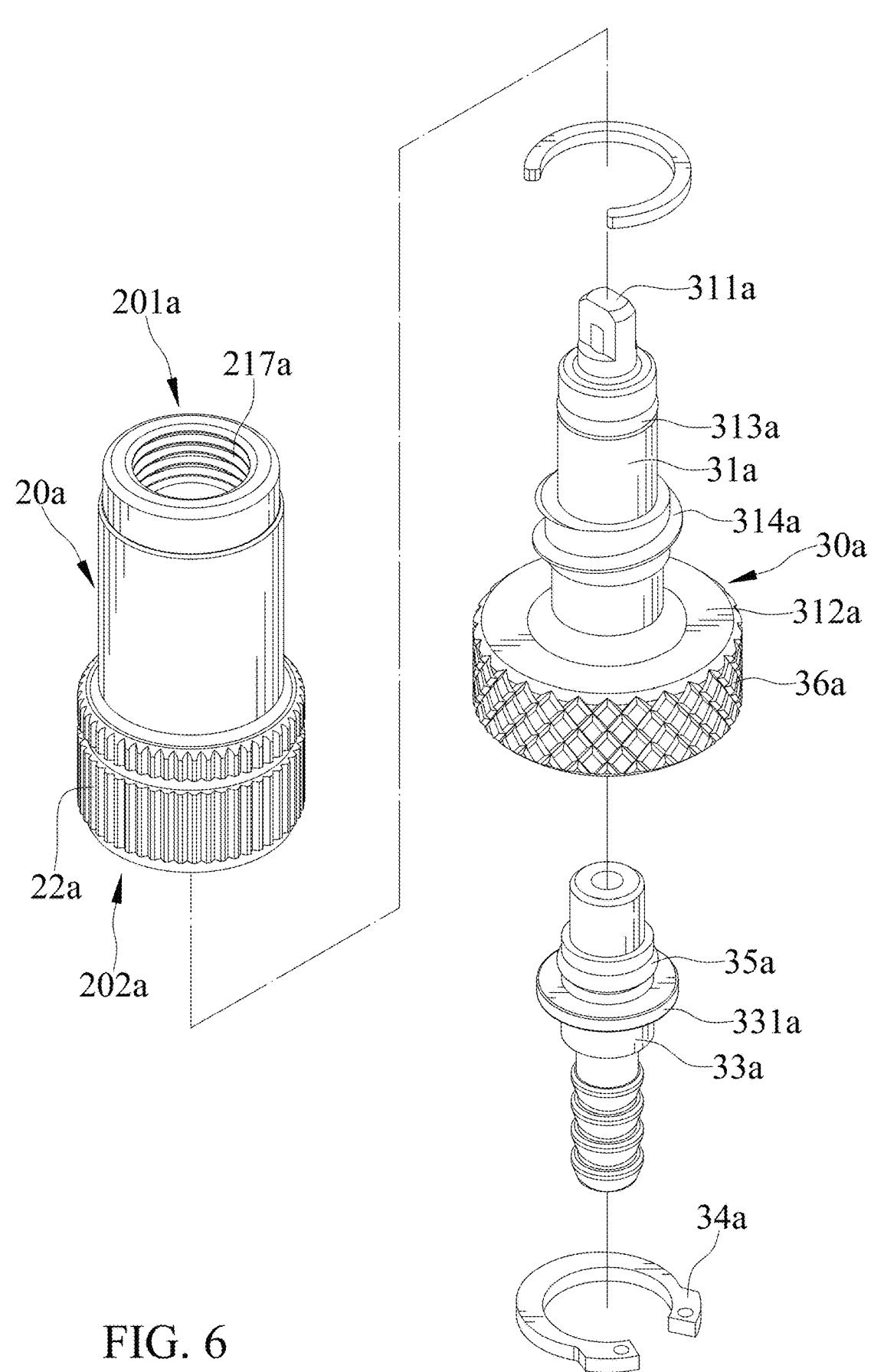
FIG. 6 is an exploded perspective view of a valve connector of a second embodiment according to the present invention.
Figure 7:
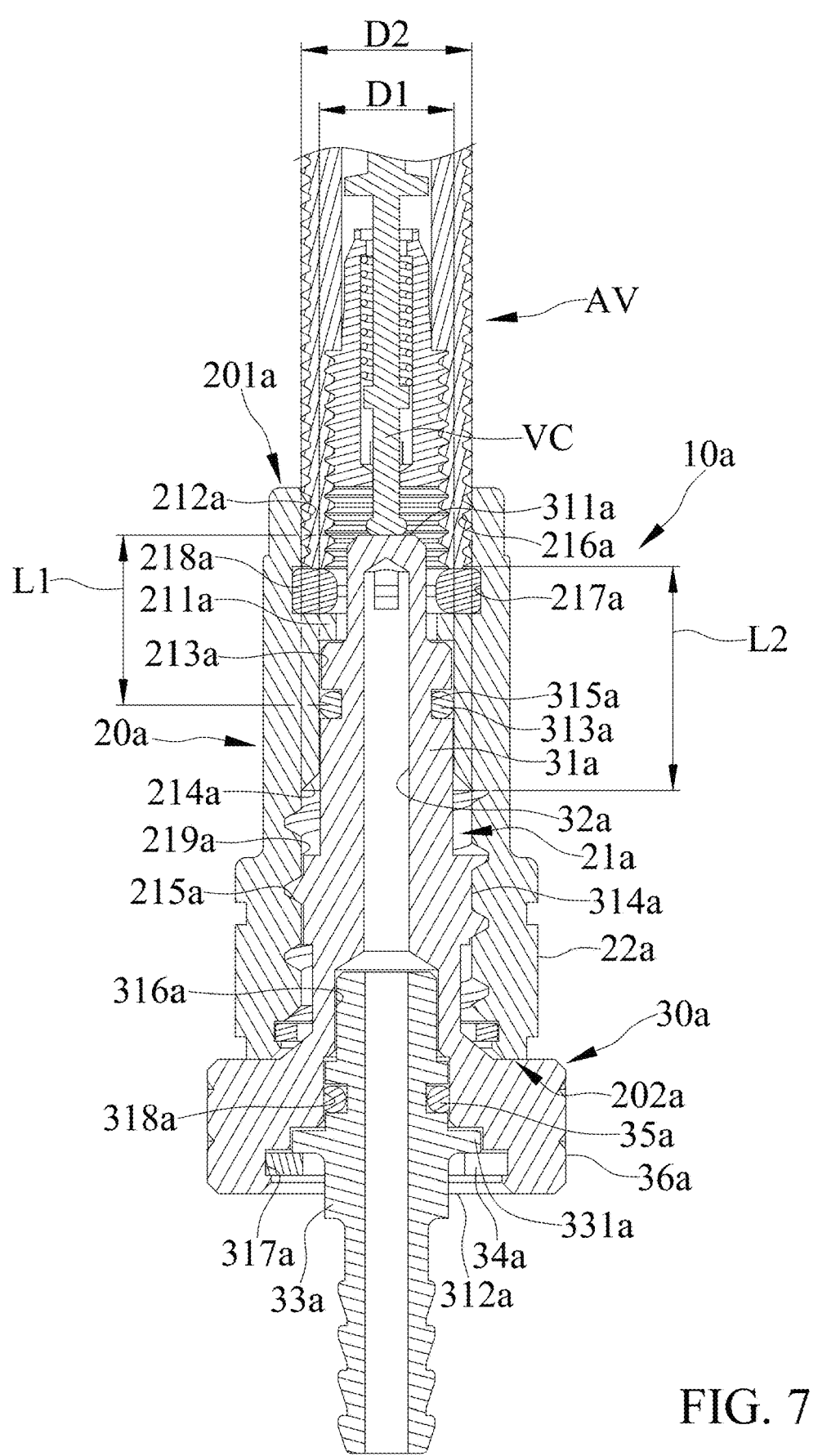
FIG. 7 is a cross-sectional view of the valve connector of FIG. 6 and shows a control component in a first position.
Figure 8:
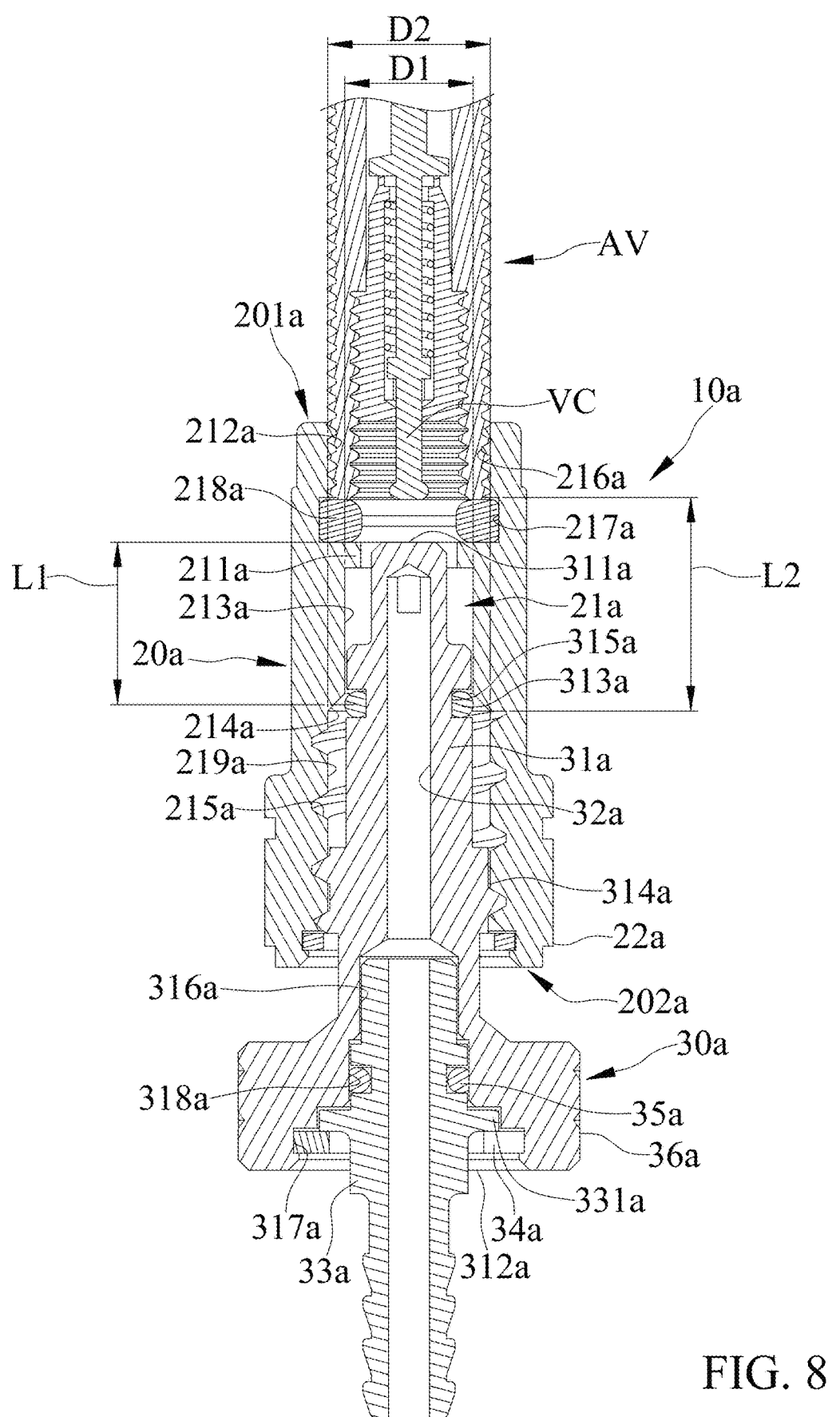
FIG. 8 is another cross-sectional view of the valve connector of FIG. 6 and shows the control component in a second position.
Figure 9:
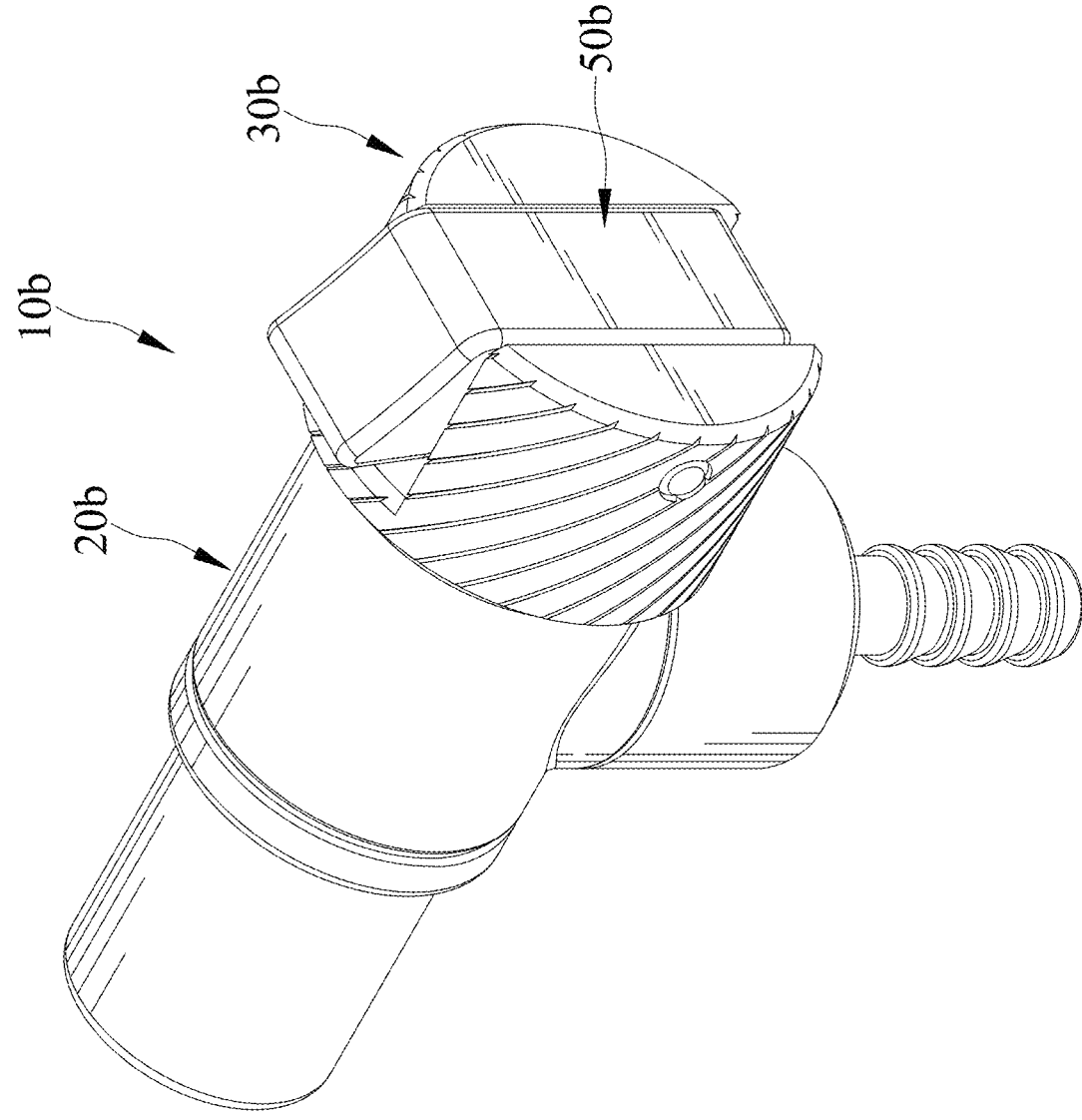
FIG. 9 is a perspective view of a valve connector of a third embodiment according to the present invention.
Figure 10:
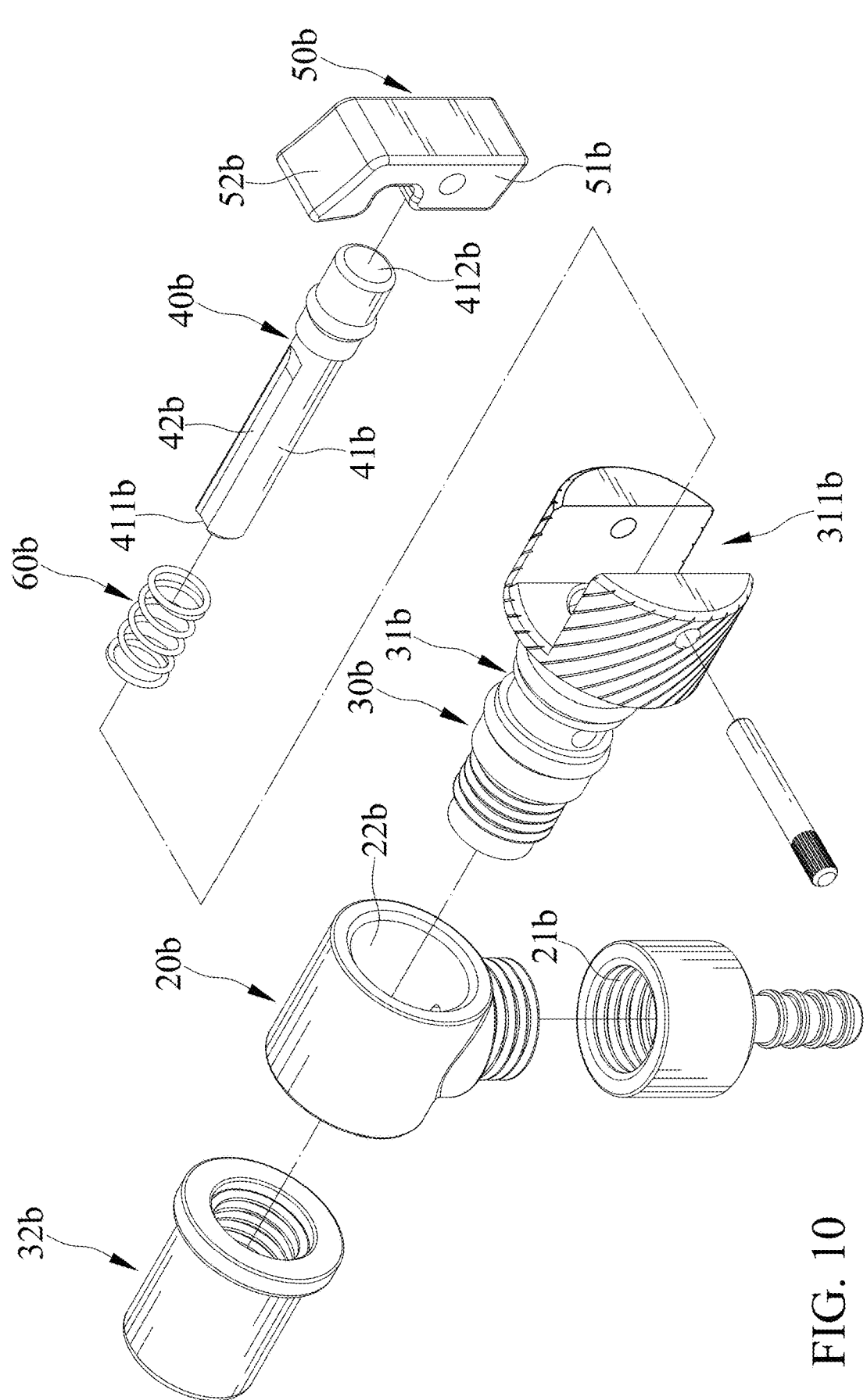
FIG. 10 is an exploded perspective view of the valve connector of FIG. 9.

FIGS. 6-8 show a valve connector 10*a* of a second embodiment according to the present invention. The valve connector 10*a* comprises a body 20*a* and a control component 30*a* moveable relative to the body 20*a*.

The body 20*a* has a first end 201*a* for connecting to a Schrader valve AV, a second end 202*a* opposite the first end 201*a*, and a through hole 21*a* extending between the first end 201*a* and the second end 202*a*. An inner peripheral surface of the through hole 21*a* forms a shoulder 211*a* dividing the through hole 21*a* into a first receiving section 212*a* and a second receiving section 213*a*. The through hole 21*a* is provided with a release portion 214*a* on an inner peripheral surface of the second receiving section 213*a*. The release portion 214*a* has a proximal end near the shoulder 211*a*, and a distal end farther from the shoulder 211*a*. The proximal end has a first inner diameter, and the distal end has a second inner diameter greater than the first inner diameter.

As shown in FIGS. 7 and 8, the control component 30*a* is movable relative to the body 20*a* in an axial direction between a first position and a second position. The control component 30*a* is provided with a body portion 31*a* and a guide hole 32*a* inside the body portion 31*a* and communicating with the through hole 21*a*. One end of the body portion 31*a* forms an abutting end 311*a* and the other end forms a control end 312*a* exposed out of the second end 202*a* for connecting to an inflating device (not shown). The guide hole 32*a* allows airflow between the abutting end 311*a* and the control end 312*a* to facilitate communication between the through hole 21*a* and the inflating device. The body portion 31*a* is provided with a sealing ring 313*a* positioned between the abutting end 311*a* and the control end 312*a*.

When the control component 30*a* is in the first position, the sealing ring 313*a* is positioned between the release portion 214*a* and the shoulder 211*a* and abuts against the inner peripheral surface of the second receiving section 213*a*, and the abutting end 311*a* inserts through the shoulder 211*a* and enters the first receiving section 212*a* to abut against a core rod VC of the Schrader valve AV. When the control component 30*a* is in the second position, the sealing ring 313*a* is positioned between the release portion 214*a* and the second end 202*a* and detaches from the inner peripheral surface of the second receiving section 213*a*, and the abutting end 311*a* withdraws from the first receiving section 212*a*.

Further, the through hole 21*a* is further divided into a third receiving section 219*a* connected with the second end of the release portion 214*a*. The second receiving section 213*a* is defined with a first internal diameter D1. The third receiving section 219*a* is defined with a second internal diameter D2 greater than the first internal diameter D1 to allow the high pressure air remaining in the through hole 21*a* after inflation to escape when the control component 30*a* is in the second position.

To allow the control component 30*a* to be rotatably inserted through the second end 202*a* and to establish an axial displacement relationship with the body 20*a*, the through hole 21*a* is provided with a first threaded section 215*a* disposed on an inner peripheral surface of the first receiving section 212*a*. An outer peripheral surface of the body portion 31*a* is provided with a second threaded section 314*a* engaged with the first threaded section 215*a* to cause an axial displacement between the control component 30*a* and the body 20*a* when the control end 312*a* is rotated.

To enable the first end 201 of the body 20 to be suitable for connection with the Schrader valve AV, the through hole 21*a* is provided with an inner thread 216*a* disposed on the inner peripheral surface of the first receiving section 212*a* for engaging with an outer thread of the Schrader valve AV. An annular groove 217*a* is provided on one side adjacent to the shoulder 211*a* and contains a sealing washer 218*a* for engaging with the Schrader valve AV. Thus, when the outer thread of the Schrader valve AV engages with the inner thread 216*a*, the Schrader valve AV can abut against the sealing washer 218*a* to prevent air leakage.

To prevent air from leaking out of the second end 202*a* of the body 20*a* during inflation, the body portion 31*a* is provided with an annular channel 315*a* positioned between the abutting end 311*a* and the control end 312*a*. The sealing ring 313*a* is positioned within the annular channel 315*a*.

Further, a first length L1 is defined from a midpoint of the annular channel 315*a* to the abutting end 311*a*, and a second length L2 is defined from the second end of the release portion 214*a* to one end of the annular groove 217*a* adjacent to the inner thread 216*a*. The second length L2 is greater than the first length L1, ensuring the high pressure air does not escape when the control component 30*a* is in the second position, before the valve core VC of the Schrader valve AV has fully closed, thereby preventing air from leaking out of the inflated object.

Furthermore, to enable the inflating device to connect with the control end 312*a*, the body portion 31*a* is provided with a connection hole 316*a* disposed at the control end 312*a* and communicating with the guide hole 32*a*. The connection hole 316*a* is connectable to a connecting component 33*a* for attaching a hose of the inflating device. The body portion 31*a* is provided with a receiving groove 317*a* and a sealing portion 318*a* within the connection hole 316*a*. An outer peripheral surface of the connecting component 33*a* is provided with a flange 331*a* disposed between the receiving groove 317*a* and the sealing portion 318*a*. A fastener 34*a* is arranged within the receiving groove 317*a* to abut against the flange 331*a*. A sealing ring 35*a* is arranged on the outer peripheral surface of the connecting component 33*a* to abut against the sealing portion 318*a*.

Additionally, to allow the user to conveniently hold the body 20*a* with one hand while rotating the control end 312*a* with the other hand, an outer peripheral surface of the body 20*a* is provided with a patterned first anti-slip section 22*a*. An outer peripheral surface of the control end 312*a* of the body portion 31*a* of the control component 30*a* is provided with a patterned second anti-slip section 36*a*.

FIGS. 9-12 show a valve connector 10*b* of a third embodiment according to the present invention. The valve connector 10*b* comprises a body 20*b*, a connecting assembly 30*b*, a control component 40*b*, and a lever 50*b*.

The body 20*b* has an air channel 21*b* adapted for connecting to an inflating device (not shown) and a penetrating hole 22*b* communicating with the air channel 21*b*.

The connecting assembly 30*b* is rotatably mounted to the penetrating hole 22*b* and configured to connect with a Schrader valve AV. The connecting assembly 30*b* is provided with a through hole 33*b* communicating with the air channel 21*b*. An inner peripheral surface of the through hole 33*b* forms a release portion 331*b* dividing the through hole 33*b* into a first receiving section 332*b* and a second receiving section 333*b*. The release portion 331*b* has a proximal end connected to the first receiving section 332*b*, and a distal end connected to the second receiving section 333*b*. The proximal end has a first internal diameter D1, and the distal end has a second internal diameter D2 greater than the first inner diameter D1 to allow the high pressure air remaining in the through hole 21*a* after inflation to escape.

Figure 11:
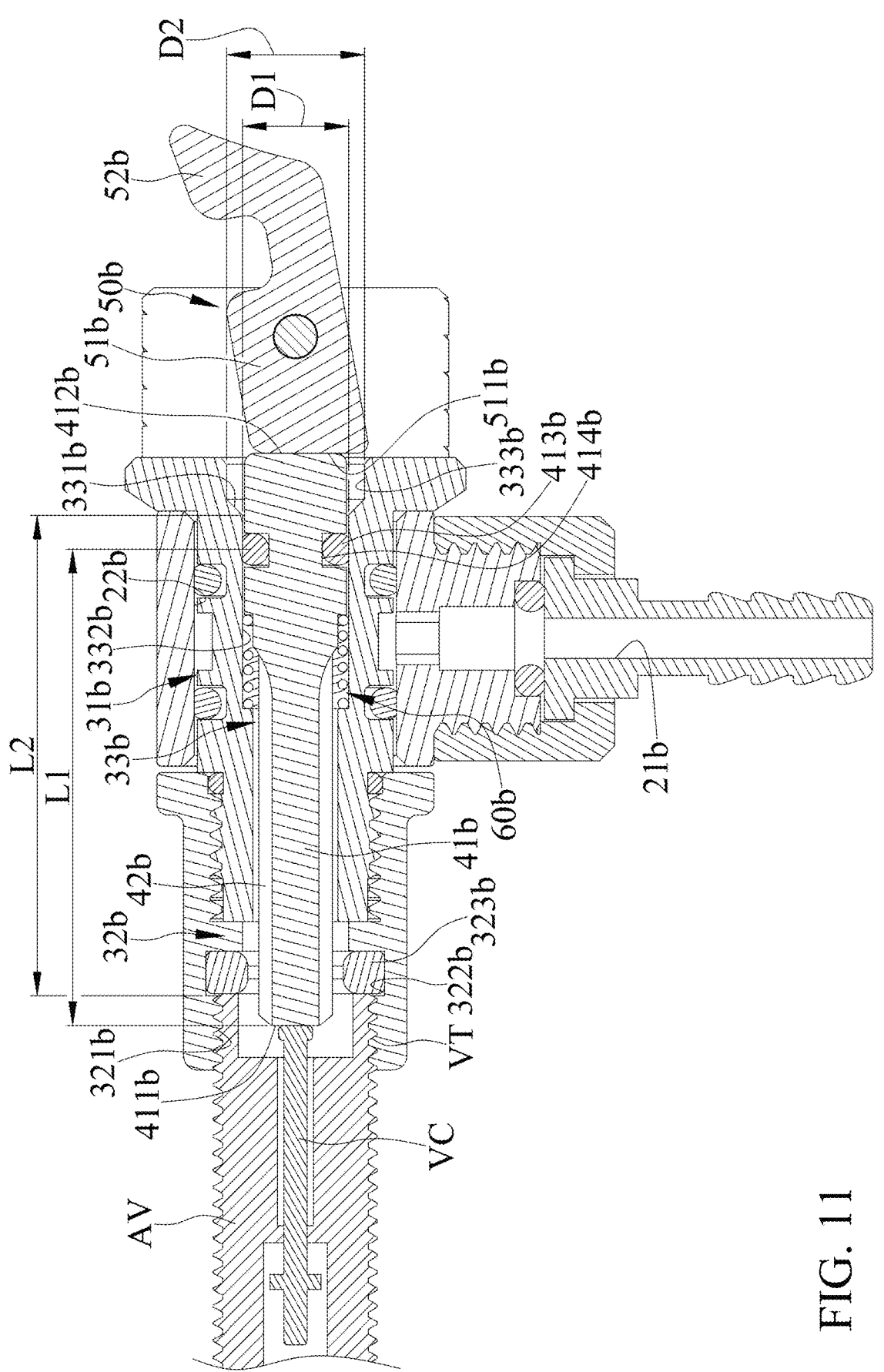
FIG. 11 is a cross-sectional view of the valve connector of FIG. 9, and shows a control component in a first position.
Figure 12:
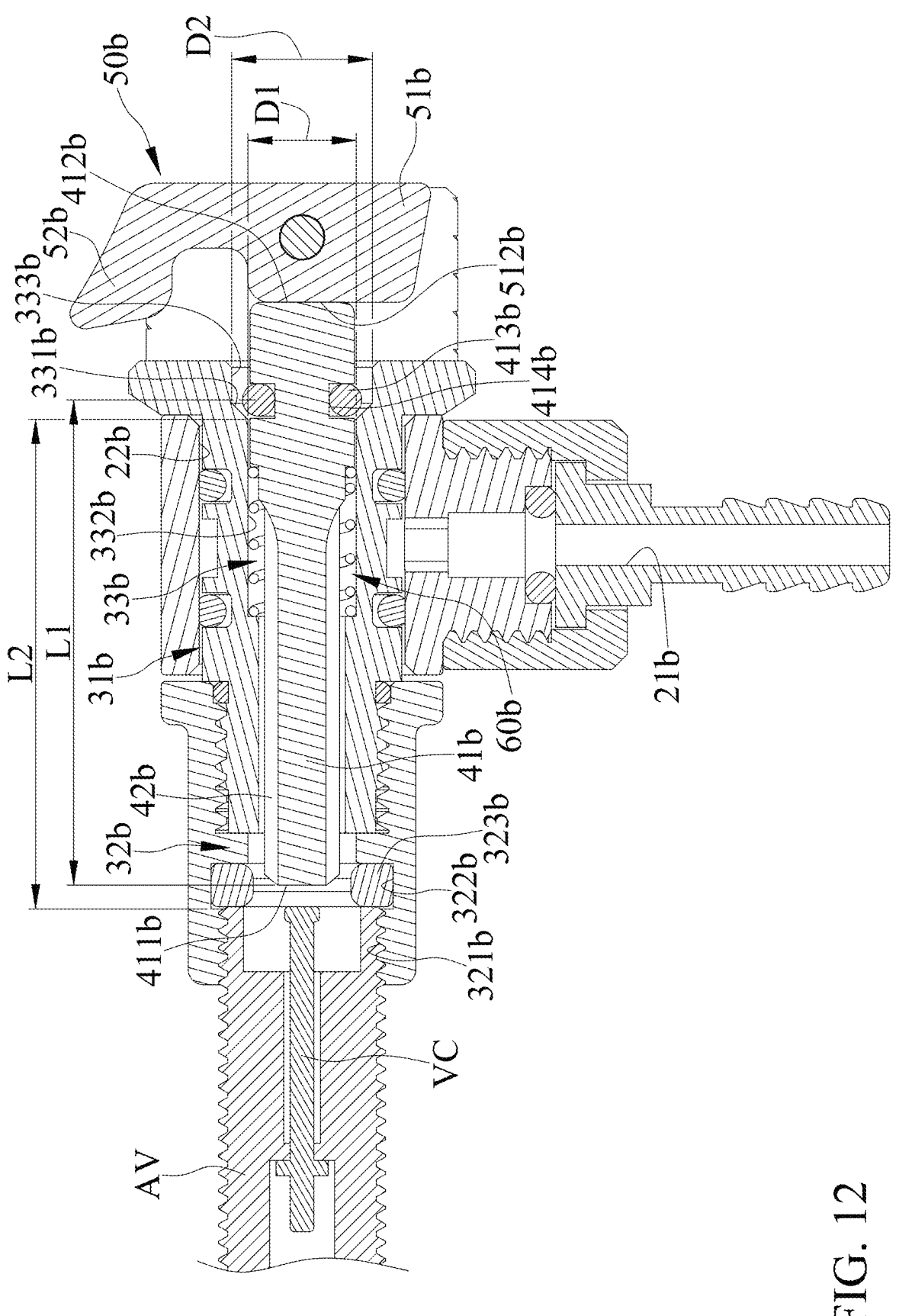
FIG. 12 is another cross-sectional view of the valve connector of FIG. 9, and shows the control component in a second position.

As shown in FIGS. 11 and 12, the control component 40*b* is movable relative to the connecting assembly 30*b* in an axial direction between a first position and a second position. The control component 40*b* is provided with a body portion 41*b* and a guide recess 42*b* outside the body portion 41*b* and communicating with the through hole 33*b*. One end of the body portion 41*b* forms an abutting end 411*b* and the other end forms a control end 412*b* exposed out of the through hole 33*b*. The guide recess 42*b* allows airflow from the abutting end 411*b* to facilitate communication between the through hole 33*b* and the air channel 21*b*. The body portion 41*b* is provided with a sealing ring 413*b* positioned at the control end 412*b*.

The lever 50*b* is pivotally mounted to the connecting assembly 30*b* to selectively push against the control end 412*b*, actuating the control component 40*b* to switch between the first position and the second position.

When the control component 40*b* is in the first position, the sealing ring 413*b* is positioned in the first receiving section 332*b* and abuts against an inner peripheral surface of the first receiving section 332*b*, and the abutting end 411*b* abuts against a core rod VC of the Schrader valve AV to open the Schrader valve AV and prevent high pressure air from escaping through the release portion 331*b*.

When the control component 40*b* is in the second position, the sealing ring 413*b* is positioned between the release portion 331*b* and the second receiving section 333*b* and detaches from the inner peripheral surface of the first receiving section 332*b*, and the abutting end 411*b* spaced from the core rod VC of the Schrader valve AV to allow the high pressure air remaining in the through hole 33*b* after inflation to escape.

The valve connector 10*b* further comprises a biasing member 60*b*, which is configured to bias the control component 40*b* towards the second position. The lever 50*b* has a pivoting portion 51*b* and an actuation portion 52*b*. The pivoting portion 51*b* has a first abutting surface 511*b* and a second abutting surface 512*b* selectively abutting against the control end 412*b* of the control component 40*b*. When the control component 40*b* is in the first position, the first abutting surface 511*b* abuts against the control end 412*b* to actuate the abutting end 411*b* to push against the valve core VC of the air valve V, allowing the through hole 33*b* to communicate with the interior of the air valve V, and the biasing member 60*b* is compressed. When the control component 40*b* is in the second position, the second abutting surface 512*b* abuts against the control end 412*b*, and the abutting end 411*b* is spaced from the valve core VC of the air valve V, and the biasing member 60*b* is uncompressed.

The connecting assembly 30*b* includes a first connecting member 31*b* rotatably inserted into the through hole 33*b*, and a second connecting member 32*b* threadedly connected with the first connecting member 31*b*. The lever 50*b* is eccentrically pivotally mounted on the first connecting member 31*b*. The biasing member 60*b* is positioned within the first connecting member 31*b*. The second connecting member 32*b* protrudes from the penetrating hole 22*b* and configured to connect with the Schrader valve AV.

Further, the first connecting member 31*b* is provided with a pivoting notch 311*b* pivotally connected with the pivoting portion 51*b* of the lever 50*b*.

The second connecting member 32*b* is provided with an inner thread 321*b* therein. The inner thread 321*b* is configured to detachably engage with an outer threaded portion VT of the Schrader valve AV. An annular groove 322*b* is provided on one side adjacent to the inner thread 321*b* and contains a sealing washer 323*b* for engaging with the Schrader valve AV.

The control end 412*b* of the control component 40*b* is provided with an annular channel 414*b*. The sealing ring 413*b* is positioned within the annular channel 414*b*. A first length L1 is defined from a midpoint of the annular channel 414*b* to the abutting end 411*b*. A second length L2 is defined from the proximal end of the release portion 331*b* to one end of the annular groove 322*b* adjacent to the inner thread 321*b*. The second length L2 is greater than the first length L1, ensuring the high pressure air does not escape when the control component 40*b* is in the second position, before the valve core VC of the Schrader valve AV has fully closed, thereby preventing air from leaking out of the inflated object.

Although specific embodiments have been illustrated and described, numerous modifications and variations are still possible without departing from the scope of the invention. The scope of the invention is limited by the accompanying claims.

The invention claimed is:

1. A valve connector, comprising:
   a body having a first end for connecting to a Schrader valve, a second end opposite the first end, and a through hole extending between the first end and the second end, wherein an inner peripheral surface of the through hole forms a shoulder dividing the through hole into a first receiving section and a second receiving section, and wherein the through hole is provided with a sealing ring on an inner peripheral surface of the second receiving section; and
   a control component movable relative to the body in an axial direction between a first position and a second position, wherein the control component is provided with a body portion and a guide hole inside the body portion and communicating with the through hole, wherein one end of the body portion forms an abutting end and the other end forms a control end exposed out of the second end for connecting to an inflating device, wherein the guide hole allows airflow between the abutting end and the control end to facilitate communication between the through hole and the inflating device, wherein the body portion is provided with a release portion positioned between the abutting end and the control end, wherein the release portion has a proximal end near the abutting end, and a distal end farther from the abutting end, and wherein the proximal end has a first outer diameter, and the distal end has a second outer diameter greater than the first outer diameter;
   wherein when the control component is in the first position, the sealing ring is positioned between the release portion and the control end and abuts against an outer peripheral surface of the body portion, with the abutting end inserting through the shoulder and entering the first receiving section to abut against a core rod of the Schrader valve;
   wherein when the control component is in the second position, the sealing ring is positioned between the release portion and the abutting end and detaches from the outer peripheral surface of the body portion, with the abutting end withdrawing from the first receiving section.

2. The valve connector of claim 1, wherein the through hole is provided with a first threaded section disposed on an inner peripheral surface of the first receiving section, and wherein the outer peripheral surface of the body portion is provided with a second threaded section engaged with the first threaded section to cause an axial displacement between the control component and the body when the control end is rotated.

3. The valve connector of claim 1, wherein the through hole is provided with an inner thread disposed on the inner peripheral surface of the first receiving section for engaging with an outer thread of the Schrader valve, and wherein an annular groove is provided on one side adjacent to the shoulder and contains a sealing washer for engaging with the Schrader valve.

4. The valve connector of claim 1, wherein the through hole is provided with an annular channel disposed on the inner peripheral surface of the second receiving section, and wherein the sealing ring is positioned within the annular channel to prevent air leakage from the second end of the body during inflation.

5. The valve connector of claim 1, wherein the body portion is provided with a connection hole disposed at the control end and communicating with the guide hole, and wherein the connection hole is connectable to a connecting component for attaching a hose of the inflating device, wherein the body portion is provided with a receiving groove and a sealing portion within the connection hole, wherein an outer peripheral surface of the connecting component is provided with a flange disposed between the receiving groove and the sealing portion, wherein a fastener is arranged within the receiving groove to abut against the flange, and wherein a sealing ring is arranged on the outer peripheral surface of the connecting component to abut against the sealing portion.

6. The valve connector of claim 1, wherein an outer peripheral surface of the body is provided with a patterned first anti-slip section, and wherein an outer peripheral surface of the control end of the body portion of the control component is provided with a patterned second anti-slip section.

7. A valve connector, comprising:
a body having a first end for connecting to a Schrader valve, a second end opposite the first end, and a through hole extending between the first end and the second end, wherein an inner peripheral surface of the through hole forms a shoulder dividing the through hole into a first receiving section and a second receiving section, wherein the through hole is provided with a release portion on an inner peripheral surface of the second receiving section, wherein the release portion has a proximal end near the shoulder, and a distal end farther from the shoulder, and wherein the proximal end has a first inner diameter, and the distal end has a second inner diameter greater than the first inner diameter; and
a control component movable relative to the body in an axial direction between a first position and a second position, wherein the control component is provided with a body portion and a guide hole inside the body portion and communicating with the through hole, wherein one end of the body portion forms an abutting end and the other end forms a control end exposed out of the second end for connecting to an inflating device, wherein the guide hole allows airflow between the abutting end and the control end to facilitate communication between the through hole and the inflating device, and wherein the body portion is provided with a sealing ring positioned between the abutting end and the control end;

wherein when the control component is in the first position, the sealing ring is positioned between the release portion and the shoulder and abuts against the inner peripheral surface of the second receiving section, with the abutting end inserting through the shoulder and entering the first receiving section to abut against a core rod of the Schrader valve;
wherein when the control component is in the second position, the sealing ring is positioned between the release portion and the second end and detaches from the inner peripheral surface of the second receiving section, with the abutting end withdrawn from the first receiving section.

8. The valve connector of claim 7, wherein the through hole is further divided into a third receiving section connected with the second end of the release portion, wherein the second receiving section is defined with a first internal diameter, and wherein the third receiving section is defined with a second internal diameter greater than the first internal diameter.

9. The valve connector of claim 7, wherein the through hole is provided with a first threaded section disposed on an inner peripheral surface of the first receiving section, and wherein an outer peripheral surface of the body portion is provided with a second threaded section engaged with the first threaded section to cause an axial displacement between the control component and the body when the control end is rotated.

10. The valve connector of claim 7, wherein the through hole is provided with an inner thread disposed on the inner peripheral surface of the first receiving section for engaging with an outer thread of the Schrader valve, and wherein an annular groove is provided on one side adjacent to the shoulder and contains a sealing washer for engaging with the Schrader valve, wherein the body portion is provided with an annular channel positioned between the abutting end and the control end, and wherein the sealing ring is positioned within the annular channel.

11. The valve connector of claim 10, wherein a first length is defined from a midpoint of the annular channel to the abutting end, wherein a second length is defined from the second end of the release portion to one end of the annular groove adjacent to the inner thread, and wherein the second length is greater than the first length.

12. The valve connector of claim 7, wherein the body portion is provided with a connection hole disposed at the control end and communicating with the guide hole, and wherein the connection hole is connectable to a connecting component for attaching a hose of the inflating device, wherein the body portion is provided with a receiving groove and a sealing portion within the connection hole, wherein an outer peripheral surface of the connecting component is provided with a flange disposed between the receiving groove and the sealing portion, wherein a fastener is arranged within the receiving groove to abut against the flange, and wherein a sealing ring is arranged on the outer peripheral surface of the connecting component to abut against the sealing portion.

13. The valve connector of claim 7, wherein an outer peripheral surface of the body is provided with a patterned first anti-slip section, and wherein an outer peripheral surface of the control end of the body portion of the control component is provided with a patterned second anti-slip section.

14. A valve connector, comprising:
a body having an air channel and a penetrating hole communicating with the air channel;

a connecting assembly rotatably mounted to the penetrating hole and configured to connect with a Schrader valve, wherein the connecting assembly is provided with a through hole communicating with the air channel, wherein an inner peripheral surface of the through hole forms a release portion dividing the through hole into a first receiving section and a second receiving section, wherein the release portion has a proximal end connected to the first receiving section, and a distal end connected to the second receiving section, and wherein the proximal end has a first internal diameter, and the distal end has a second internal diameter greater than the first inner diameter;

a control component movable relative to the connecting assembly in an axial direction between a first position and a second position, wherein the control component is provided with a body portion and a guide recess outside the body portion and communicating with the through hole, wherein one end of the body portion forms an abutting end and the other end forms a control end exposed out of the through hole, wherein the guide recess allows airflow from the abutting end to facilitate communication between the through hole and the air channel, and wherein the body portion is provided with a sealing ring positioned at the control end; and a lever pivotally mounted to the connecting assembly to selectively push against the control end and actuate the control component to switch between the first position and the second position;

wherein when the control component is in the first position, the sealing ring is positioned in the first receiving section and abuts against an inner peripheral surface of the first receiving section, with the abutting end abutting against a core rod of the Schrader valve;

wherein when the control component is in the second position, the sealing ring is positioned between the release portion and the second receiving section and detaches from the inner peripheral surface of the first receiving section, with the abutting end spaced from the core rod of the Schrader valve.

15. The valve connector of claim 14, further comprising:

a biasing member configured to bias the control component towards the second position, wherein the lever has a pivoting portion and an actuation portion, and wherein the pivoting portion has a first abutting surface and a second abutting surface selectively abutting against the control end of the control component;

wherein when the control component is in the first position, the first abutting surface abuts against the control end to actuate the abutting end to push against the valve core of the air valve, allowing the through hole to communicate with the interior of the air valve, and the biasing member is compressed;

wherein when the control component is in the second position, the second abutting surface abuts against the control end, and the abutting end is spaced from the valve core of the air valve, and the biasing member is uncompressed.

16. The valve connector of claim 15, wherein the connecting assembly includes a first connecting member rotatably inserted into the through hole, and a second connecting member threadedly connected with the first connecting member, wherein the lever is eccentrically pivotally mounted on the first connecting member, wherein the biasing member is positioned within the first connecting member, and wherein the second connecting member protrudes from the penetrating hole and configured to connect with the Schrader valve.

17. The valve connector of claim 16, wherein the first connecting member is provided with a pivoting notch pivotally connected with the pivoting portion of the lever.

18. The valve connector of claim 15, wherein the second connecting member is provided with an inner thread therein, and wherein the inner thread is configured to detachably engage with an outer threaded portion of the Schrader valve, and wherein an annular groove is provided on one side adjacent to the inner thread and contains a sealing washer for engaging with the Schrader valve.

19. The valve connector of claim 18, wherein the control end of the control component is provided with an annular channel, and wherein the sealing ring is positioned within the annular channel, wherein a first length is defined from a midpoint of the annular channel to the abutting end, wherein a second length is defined from the proximal end of the release portion to one end of the annular groove adjacent to the inner thread, and wherein the second length is greater than the first length.

* * * * *